United States Patent [19]

Parzefall

[11] Patent Number: 4,648,500
[45] Date of Patent: Mar. 10, 1987

[54] CLUTCH RELEASE MEANS

[75] Inventor: Walter Parzefall, Bubenreuth, Fed. Rep. of Germany

[73] Assignee: INA Walzlager Schaeffler KG, Fed. Rep. of Germany

[21] Appl. No.: 709,515

[22] Filed: Mar. 8, 1985

[30] Foreign Application Priority Data

Mar. 29, 1984 [DE] Fed. Rep. of Germany ....... 3411641

[51] Int. Cl.$^4$ .............................................. F16D 13/70
[52] U.S. Cl. ................................ 192/99 S; 192/109 R
[58] Field of Search ............ 192/98, 99 S, 101, 109 R, 192/89 B

[56] References Cited

U.S. PATENT DOCUMENTS

| 2,700,262 | 1/1955 | Andrews | 192/99 S X |
| 2,995,406 | 8/1961 | Pitner | 192/98 X |
| 3,277,988 | 10/1966 | Pitner | 192/98 |
| 3,317,014 | 5/1967 | Pitner | 192/98 |
| 3,901,362 | 8/1975 | Selzer | 192/98 |

FOREIGN PATENT DOCUMENTS

| 711598 | 6/1931 | France | 192/99 S |
| 1240463 | 7/1971 | United Kingdom | 192/98 |

Primary Examiner—George H. Krizmanich
Attorney, Agent, or Firm—Charles A. Muserlian

[57] ABSTRACT

A clutch release means for motor vehicles consisting of a housing holding a rolling bearing, said housing being axially moveable on a guide concentric with the clutch axis under the action of a pivoted clutch fork characterized in that the housing (1) has curvatures (7) at the contact points with clutch fork (3) which are turned toward the latter and whose vertices lie in a plane passing through clutch axis (8) and the contact surfaces (9) of clutch fork (3) have a flat form.

2 Claims, 1 Drawing Figure

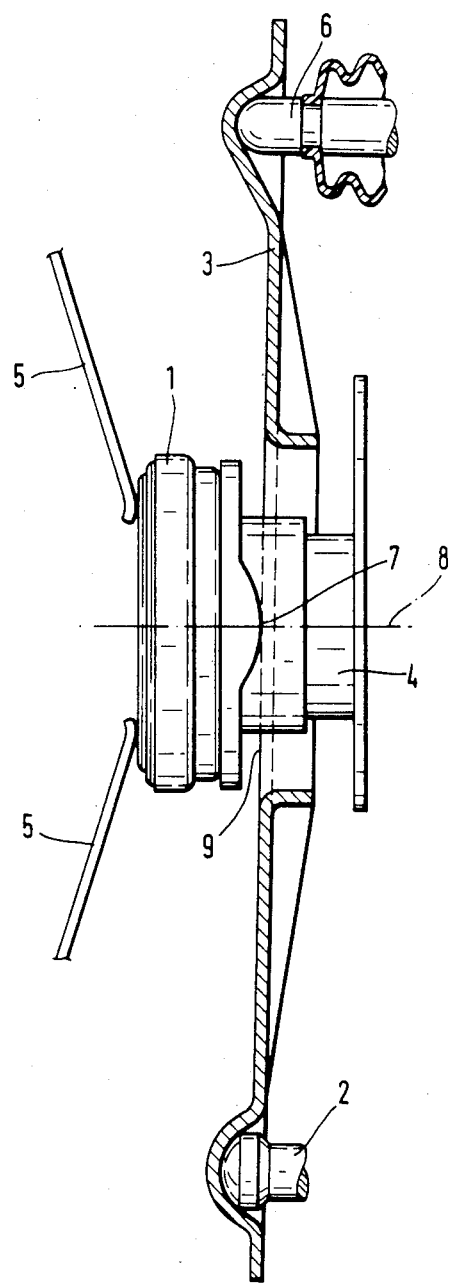

CLUTCH RELEASE MEANS

STATE OF THE ART

Clutch release devices for motor vehicles, consisting of a housing holding a rolling bearing, which housing is axially moveable on guiding devices concentric with the clutch axis under the influence on a pivoted clutch fork are known and have a clutch fork to activate the clutch, which at one end is hinged on a fixed ball end and at its other end interacts with an actuating element. At the intervening points of contact with the clutch release bearing, the clutch fork is provided with curvatures that are turned towards the clutch release bearing. Since the clutch fork is manufactured as a drawn sheet metal piece with relatively wide tolerances and variations. in dimensions are unavoidable between the clutch axis and the ball end, this leads to a mismatch between clutch release bearing and clutch fork so that when the clutch is actuated, the introduction of force is no longer axis-neutral. The clutch release is thereby tilted, leading to tightne and thus to premature wear and tear (DE-GM No. 19 49 559).

OBJECTS OF THE INVENTION

It is an object of the invention to develop a clutch release device in which tolerances present therein are compensated in a simple way and tilting of the clutch release device is impossible.

This and other objects and advantages of the invention will become obvious from the following detailed description.

THE INVENTION

The novel clutch release means of the invention for motor vehicles consisting of a housing holding a rolling bearing, said housing being axially moveable on guiding means concentric with the clutch axis under the action of a pivoted clutch fork is characterized in that the housing (1) has curvatures (7) at the contact points with clutch fork (3) which are turned towards the latter and whose vertices lie in a plane passing through clutch axis (8) and the contact surfaces (9) of clutch fork (3) have a flat form.

The construction of the invention has the advantage in that the flat clutch fork will always come in contact with the vertices of the curvatures so that the introduction of force upon the clutch release bearing being actuated will always be axis-neutral, despite the tolerances present at the clutch fork itself or when there are variations in dimension between the clutch axis and the ball end. In a further embodiment of the invention, it is provided that the housing be formed of a polymer material as a cast or molded part as it is then possible to form the curvatures at the same time without any effort, bringing about a considerable simplification over the known state of the art.

Referring now to the drawing:

The FIGURE is a partial longitudinal view of one embodiment of the clutch release means of the invention.

In the FIGURE, the housing 1 of a clutch release bearing holds a rolling bearing not shown in a known manner and, under the influence of a clutch fork 3 pivoted on a fixed ball end 2, is axially moveable on a guide tube 4 to interact with the cup spring tongues 5 of a clutch not shown in the drawing. To this end, an indicated actuating element 6 acts on the other end of the clutch fork 3. Housing 1 has, at the contact points with clutch fork 3, curvatures 7 turned towards the latter with vertices lying in a plane passing through the clutch axis 8. Curvatures 7 abut the flat contact surfaces 9 of the clutch fork 3. When the clutch release bearing is actuated, the introduction of force through contact surfaces 9 of clutch fork 3 is always axis-neutral, since the vertices of curvatures 7 lie in a plane passing through clutch axis 8. It is irrelevant whether clutch fork 3 does itself deviate from the prescribed tolerance, or whether variations of dimension between clutch axis 8 and ball end 2 are present.

Various modifications of the clutch release bearing of the invention may be made without departing from the spirit or scope thereof and it should be understood that the invention is intended to be limited only as defined in the appended claims.

What I claim is:

1. A clutch release means for motor vehicles consisting of a housing holding a rolling bearing, said housing being axially moveable on guiding means concentric with the clutch axis under the action of a pivoted clutch fork characterized in that the housing (1) has curvatures (7) at the contact points with clutch fork (3) which are turned toward the latter and whose vertices lie in a plane passing through clutch axis (8) and the contact surfaces (9) of clutch fork (3) have a flat form.

2. The clutch release means of claim 1 wherein the housing (1) is formed as a cast or molded polymeric element.

* * * * *